March 24, 1936.  J. A. CHARTER  2,035,049
STARTING MECHANISM
Filed July 30, 1932
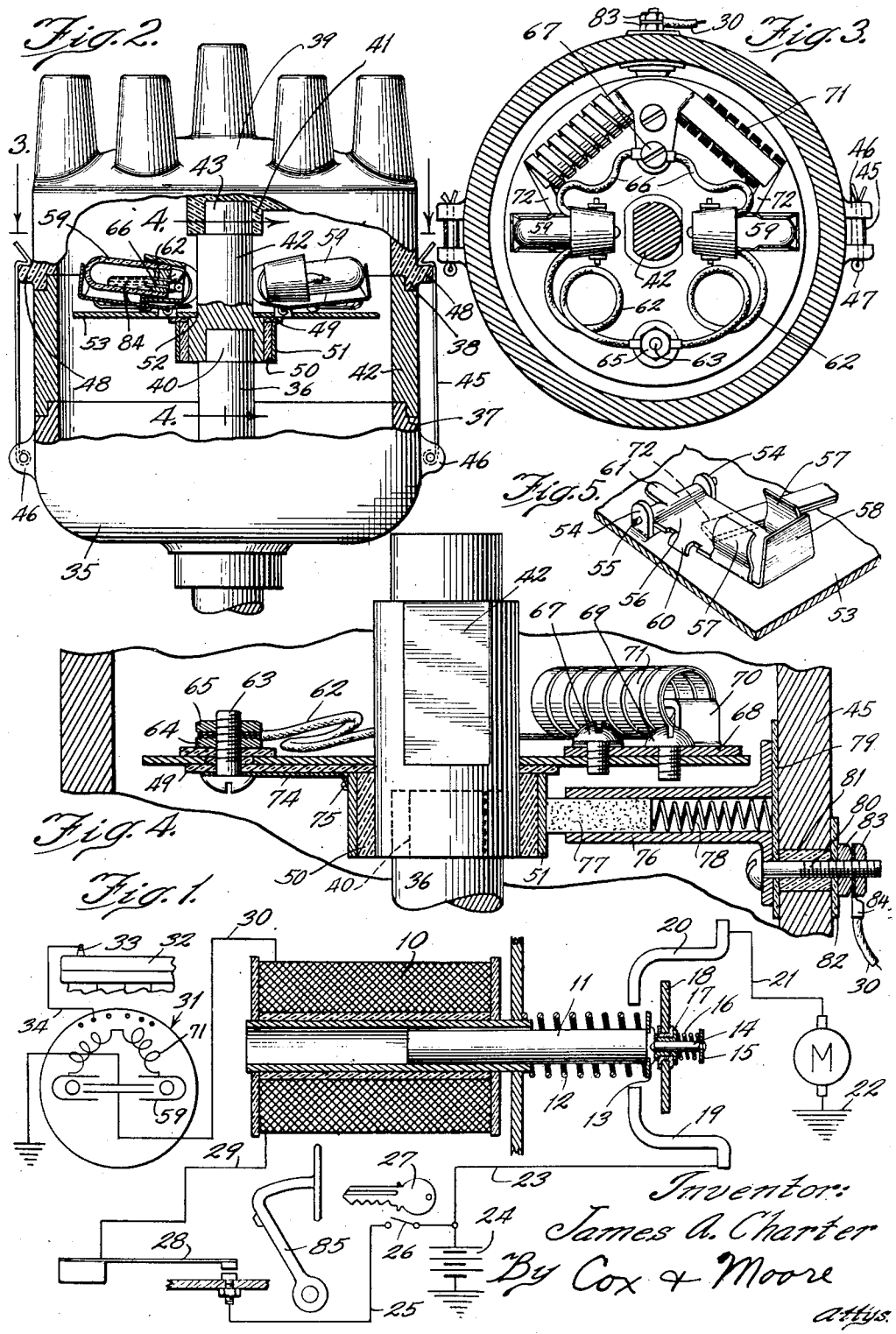
Inventor:
James A. Charter
By Cox & Moore
attys.

Patented Mar. 24, 1936

2,035,049

UNITED STATES PATENT OFFICE 2,035,049

STARTING MECHANISM

James A. Charter, Chicago, Ill., assignor to Charter Automatic Starter Inc., Chicago, Ill., a corporation of Illinois Application July 30, 1932, Serial No. 626,738

13 Claims. (Cl. 290—38)

The present invention relates to starting mechanism for automobile engines and the like, and one of the objects of this invention resides in the provision of a suitably operated switch which automatically interrupts the control circuit to the starter on an automobile after the automobile engine is started and is driven under its own power.

Another object of this invention resides in the provision of a centrifugally operated switch, thermostatically controlled for the purpose of enabling a better starting of the engine in cold weather and providing for an adjustment of the centrifugally operated switch whereby the starting mechanism operates more uniformly during different conditions of the engine to be started.

Another object of this invention is to provide a switch which normally interrupts the control circuit for the starter of an automobile engine or the like after the engine has been started and is being driven under its own power. The switch is so constructed that the engine may be idled down to a very slow speed when the engine is warm without causing the switch to open the starting mechanism.

Another object of this invention is to provide a switch in the starting mechanism for an automobile engine which is automatically actuated to interrupt the control circuit for the starting mechanism when the engine becomes self-actuated, and to this end I provide a centrifugally controlled switch which opens on predetermined speeds imparted to a rotating element on the engine, preferably the shaft of the distributor.

A still further object of this invention is to thermostatically control an interrupting switch for the control circuit of a starting mechanism for engines and the like which is automatically interrupted when the engine becomes self-actuated and when the engine operates at very low speeds, and which at the same time provides means whereby when an engine is cold, the engine may be given a higher speed to start the same than is necessary when the engine becomes warm, thereby permitting a slower idling speed of the engine without bringing the switch into operation again to close the portion of the control circuit with which it is associated.

Another object of this invention resides in preventing this mechanism from becoming inoperative on sloping surfaces where the engine is tilted at an abnormal angle such as would be the case where an automobile was parked at the side of a road where there is a sloping shoulder, or on a hill. Under either of these conditions, the switch operates to interrupt the control circuit when the engine is started and will always provide an efficient contact to complete the circuit. It will be understood that there may be other switches in the control circuit which must also be controlled to start the starting mechanism, and the closing of this switch does not necessarily close the entire circuit. In fact, it will not do so unless the other switches are also closed.

Another object of this invention is to provide a switch to be associated with an ordinary distributor either directly attached thereto as a part thereof or supplied as an accessory thereto. In carrying out this object, the switch would normally be built right into the distributor on new automobiles but would generally be supplied as an accessory to automobiles provided with the ordinary distributor. In the latter case, the switch is applied to the distributor to take the place of the ordinary distributor arm and to form an extension upon which the distributor arm is applied. An extension for the casing is also provided to be interposed between adjacent sections of the distributor casing so as to maintain the distributor arm in juxtaposition with the leads therefrom to the various cylinders.

Other objects of this invention will appear hereinafter as the description thereof proceeds, the novel features, arrangements and combinations being clearly set forth in the appended claims.

In the drawing:

Fig. 1 represents a diagrammatic view of a control circuit embodying my invention;

Fig. 2 represents a vertical elevation of a distributor having my invention applied thereto, parts of the casing being broken away for the sake of clearness;

Fig. 3 is a section taken on the line 3—3 of Fig. 2;

Fig. 4 is a cross-section taken substantially along the line 4—4 of Fig. 2; and

Fig. 5 represents an isometric view of one of the clips for holding a mercury contact tube.

My invention preferably embodies in connection with an ordinary starting motor indicated by the reference character M in Fig. 1, an electrical control circuit in which there are interposed three switches, one of which is key operated and becomes closed by turning on the ignition switch of the engine, another of which is operator controlled as by the hand or foot of the operator, and the other of which is centrifugally or otherwise operated to interrupt the control circuit when the engine becomes self-actuated and turning over at a predetermined speed.

All three of these switches must be closed in order that the starter operate. In the preferred embodiment of my invention, the centrifugally controlled switch is usually in the "On" position when the engine is "Dead" and the other two switches are normally open. The operator turns the ignition key and in so doing, operates the key control switch, thereby putting into operation two of the three switches. It is then necessary to move the operator-controlled switch to complete the circuit, thereby actuating the starter which in turn, turns over the motor. When the motor turns over at and above a predetermined speed after having been started, the centrifugal switch is operated to break the circuit and render the starter inoperative.

In the drawing, the reference numeral 10 indicates a solenoid having a core 11 and a spring 12 surrounding the core and abutting against a washer 13 thereon to normally urge the core to the right. The core 11 has a co-axially extending pin 14 having an insulated washer 15 thereon against which one end of a spring 16 abuts, the other end of the spring abutting against an insulator 17 interposed between the pin 14 and the disk 18. The disk 18 is adapted to bridge the gap between the contact members 19 and 20 arranged in the starting circuit, the contact member 20 being connected by a lead 21 to the motor and to the ground at 22. The contact member 19 is connected by means of the lead 23 to a battery 24 which is grounded, and thus when the solenoid 10 is energized, the core 11 is drawn to the left and the disk 18 bridges the gap between the contacts 19 and 20 and the current flows from the battery 24 through the motor M.

However, the solenoid 10 cannot be energized until the control circuit for the solenoid is completed and this circuit includes three electrical switches, one key operated, one operator controlled, and the third controlled by centrifugal force but normally in closed position. The solenoid circuit includes the switch 26, lead 25, operator controlled switch 28, lead 29, solenoid 10, lead 30, and centrifugally operated switch 31, the latter being grounded as clearly indicated in the drawing. 32 indicates an automobile engine and 33 a spark plug of the automobile with a lead 34 to a contact on the switch 31 which also represents diagrammatically the distributor, of an automobile. The distributor is not at all affected by means of the starting mechanism but works independently thereof and details of the distributor will not be described except insofar as necessary to describe this invention.

The principal feature of my invention resides in the centrifugally operated thermostatically controlled switch 31 constructed in the present instance as an attachment to the ordinary distributor on an automobile. The details of this switch are best illustrated in Figs. 2 to 5 inclusive.

In Fig. 2, I have indicated the bottom section of a distributor casing by the reference numeral 35, the same being supported in any suitable manner and having an upwardly extending rotating shaft 36 disposed centrally thereof as is usual in this type of construction. The lower portion of the distributor casing which I will hereinafter refer to as the distributor body has an annular shouldered recess 37 extending therearound which ordinarily receives the annular depending flange portion 38 on the distributor cap 39. The shaft 36 has the upper end 40 thereof of irregular shape to receive the distributor arm 41 so as to cause the distributor arm to rotate with the shaft 36 in the usual manner.

In carrying out my invention, I remove the cap and distributor arm and place on the portion 40 of the shaft 36 my centrifugally operated switch, the same being provided with a recess which fits the portion 40 of the shaft 36 so as to rotate with the shaft. This switch comprises an extension shaft 42, the lower end of which is recessed to receive the end 40 of the shaft 36 and the upper end 43 of which is shaped exactly as the portion 40 on the shaft 36 so that the distributor arm 41 can be placed thereon so as to cooperate with the contacts in the cap 39 which in carrying out my invention is held at a higher elevation than ordinarily by means of an annular member 44, the upper and lower peripheral edges of which are shaped to cooperate with the grooves 37 and the tongue 38 as is quite clearly illustrated in Fig. 2. In this manner, my switch can be interposed between the two parts of a distributor casing very quickly and without modifying the existing structure of the distributor except that it is necessary to provide new spring clips 45 which are pivoted to the lugs 46, the same being longer than the ordinary spring clip necessary on the distributor casing. This spring clip is provided with a switch made according to my invention and is attached to the distributor body by means of a cotter key 47 or the like, the other clip which is originally provided with the distributor being removed to permit the substitution of the longer spring clip 45. These spring clips 45 hook over lugs 48 on the cap and hold the cap, switch, and distributor body in proper operative relation with respect to each other.

Surrounding the lower end of the shaft 42 is an insulating disk 49 and insulating ring 50 about which there is arranged a brass ring 51. Resting on a shouldered portion 52 of the shaft 42 is a disk 53 which carries a pair of mercury switches which are centrifugally operated to interrupt the circuit to the solenoid 10.

The disk 53 has struck up lugs 54 through which the pivot pins 55 extend. Each pivot pin supports a cradle 56 formed of sheet metal and which has upwardly extending clips 57 and 58 to hold the mercury tube 59 in position thereon. The clip 58 permits outward movement of the tube 59 under the action of centrifugal force whereas the clips 57 carry the tube around with the disk as it rotates with the shaft 36. The cradle 56 is provided with a downwardly extending projection 60 which limits the downward movement of the mercury tube in a vertical direction and a tongue 61 which limits the upward movement of the tubes to increase the angle which these tubes bear to the horizontal.

As is best illustrated in Fig. 3, each of the tubes 59 is connected by a lead 62 to an insulated contact member 63 in the form of a screw having suitable lock nuts 64 and 65 for securing the screw to the disk and for holding the free end of the leads 62. The tubes 59 also have leads 66 which extend to a grounded contact member 67 which is one of the screws for holding the plate 68 in position on the disk 53. The plate 68 is also held in position by the screws 69 and has upwardly and then laterally extending horizontal arms 60 arranged at a little more than 90° with respect to each other as clearly shown in Fig. 3. Surrounding each of these arms 70 are coiled bi-metal thermostatic elements 71, one end of each of which adjacent the plate 68 is secured thereto by means of soldering or the like, and the other ends 72 of which are each secured to the under side of different ones of the cradles 56. This will be apparent from an inspection of Fig. 5 in which one of the ends 72 is shown in dotted lines beneath the cradle and this end is secured to the under side of the cradle by means of soldering or the like. Therefore, as the temperature around the thermostatic elements changes, the latter change their shape so as to cause a raising or lowering of the free ends 72 thereof thereby raising or lowering the cradles 56. The motion of the cradles is limited by means of the aforesaid downwardly extending projections 60 and the tongues 61.

Current is supplied to the insulated contact member 63 by means of a spring clip 74 soldered at 75 to the brass ring 51, the free end of the spring clip 74 being arranged underneath the head of the screw 63. To the inside of the annular ring 45 beneath the disk 53, I arrange a brush holder 76 having a brush 77 therein spring pressed by means of a spring 78 against the brass ring 51. The brush holder 76 is of metal and is insulated from the ring 45 by means of an insulating washer 79. The brush holder is held in place by a single screw 80 passing through the flared base of the brush holder and through the ring 45. The screw 80 is insulated from the ring 45 by means of the insulating members 79, 81, and 82. A pair of lock nuts 83 are arranged on the outside end of the screw 80 to hold the screw in place and to provide means whereby the end 84 of the lead 30 can be connected with the screw 80 to carry the electricity through the brush holder 76 and brush 77 to the ring 51 and mercury tubes 59.

As will be seen at the left in Fig. 2, the mercury tube 59 has the free ends of the leads 62 and 66 projecting into the same and a globule of mercury 84 is within the tube and normally moves by gravity to bridge the gap between the leads 62 and 66.

I will now describe the operation of my device. Let us first assume that the cradles 56 are in their lowermost positions permitted by the lugs 60. This is the position which they will generally occupy after the engine is warmed up. The globules of mercury 84 in each of the tubes close the circuit through the tubes and through the solenoid to the switch 28. The operator inserts the key 27 closing the switch 26 and then pushes on the pedal 85 which is preferably the clutch pedal of an automobile, and by the operation of this pedal, the switch 28 is engaged and closed thereby completing the circuit from the battery through the switches 26, 28, and 31. This energizes the solenoid 10 and closes the circuit to the starting motor M in the manner which has previously been described. The motor begins to turn the engine over and as soon as the engine becomes self-actuated, the distributor shaft 36 is rotated at a speed sufficient to throw the globule of mercury 84 to the outer ends of the tubes thereby interrupting the circuit through the solenoid and release the motor even though the switches 26 and 28 remain closed. The operator, in the meantime, may shift gears and let out the clutch pedal in the usual manner to set the automobile in motion. The minimum angle for the tubes 59 is so adjusted that the engine can idle down to a very slow speed without permitting the mercury globules to move into contact with the leads 62 and 66, and therefore another operation of the starting motor is prevented even though the switches 26 and 28 remain closed. During normal driving operations, the clutch pedal 85 is out and the key 28 is open so even if the switch 31 is closed, the starter cannot operate. If the engine should stall, the switch 31 will close because the distributor shaft will not rotate, and therefore if the operator pushes in on the clutch pedal, the circuit is completed and the starting motor is again actuated to start the engine, and it will be noted that it is unnecessary to shift the gears to again start the engine.

The angle of the mercury tubes when at the minimum angle should be such as to permit the slow idling of the engine but if they were adjusted for this particular angle for a heated engine, the angle would be such that when the engine was cold, and it was necessary to spin the engine by means of the starter at a high rate of speed, as is generally the case when the engine is cold, the angle might be such that the mercury tubes would open the circuit before the engine had started. In order to compensate for the extra speed that is necessary to turn over a cold engine and to insure that the switch will not be open during the starting of the engine, I provide the thermostatic control elements 61 hereinbefore described and these are so arranged that when the engine is cold, the ends 72 thereof raise the cradles to their uppermost positions as limited by the tongues 61. This angle is sufficient to prevent the opening of the switch 31 under the speed at which the engine is turned over for starting purposes even when the engine is cold. As soon, however, as heat develops beneath the hood of the automobile, the thermostatic elements operate to lower the mercury tubes to their minimum angle whereby the engine may be idled to a very slow speed without the switch 31 being closed. The sensitivity of the thermostatically controlled elements is such that it requires only a few degrees difference in temperature to move the cradles and mercury tubes to their smallest angular position with respect to the plate 53.

Assuming that the engine is cold, and the tubes at a greater angle than indicated in Fig. 2, because of the cold condition of the engine, the operator desires to start the engine and accordingly turns the switch 27 and presses on the clutch pedal 85, thereby energizing the starting unit and the motor M which motor drives the fly-wheel of the engine in the usual manner until the engine is turning over at a sufficiently rapid rate to cause the engine to start. This speed is not great enough to throw the mercury globules 84 outwardly to the outer ends of the tubes and open the switch 31 but as soon as the engine starts and is run relatively fast to warm it up, the switch 31 opens and after it has been run for a short time, a certain amount of heat develops within the engine and in under the hood and this heat is conveyed to the thermostatic elements which in turn operate to lower the cradles in the manner set forth hereinbefore. The engine now being warm, the same can be idled and when being idled, the angle of the tubes being rather small, the switch 31 will not close and operate the starter if the clutch pedal is moved to close the switch 28. The thermostatic element is very long but arranged in a compact coil so that the same is really very sensitive but nevertheless is confined within a very small space. The thermostatic element can be made as sensitive as desired for the purpose of this invention.

Another advantage of my construction is in the arrangement of the tubes 59 on opposite sides of the axis of rotation thereof so that no matter where an automobile is standing when it is desired to start the automobile, there will always be one pair of the leads 62 and 66 which will be connected by means of the globule of mercury or the like, it being understood that in place of mercury, one could use a ball or similar contact element. Thus if the car is standing on a sloping shoulder of a road or on a hill, one of the tubes will be bound to be at the normal angle or an angle which is greater than normal.

Obviously those skilled in the art to which this invention pertains may make various changes in the combination and arrangement of parts shown in the drawing without departing from the spirit of the invention, and therefore I do not wish to be limited except as hereinafter set forth in the appended claims.

Having thus fully described my invention, what I claim as new and desire to obtain by Letters Patent is:

1. In a starting mechanism for automobile engines and the like, the combination with a starting circuit, of a starter arranged in said circuit for cranking the engine, a control circuit for said starting circuit, a centrifugally operated switch in a control circuit for said starting circuit for breaking said control circuit after the engine becomes self-actuated, said centrifugally operated switch being controlled by the movements of said engine and means for governing the responsiveness of said centrifugally operated switch to open said circuit at different engine speeds for different temperatures.

2. In a starting mechanism for automobiles and the like, the combination with a starter for actuating said engine, an electrical circuit for controlling the movement of said starter, a centrifugally operated switch controlled by said engine for breaking the starting circuit when said engine becomes self-actuated and operating at a predetermined relatively low engine speed to maintain said circuit closed, and thermostatic means for said centrifugally operated switch for decreasing the responsiveness of the centrifugal switch.

3. In a starting mechanism for automobiles and the like, the combination with a starter for actuating said engine, an electrical circuit for controlling the movement of said starter, a centrifugally operated switch in said circuit controlled by said engine for breaking said circuit when said engine becomes self-actuated, and a thermostatic control for said centrifugally operated switch for decreasing the responsiveness of said switch when a predetermined temperature is experienced, said thermostatic control being located in close proximity to the engine being started whereby the heat developed by said engine causes said thermostatic control to automatically affect the functioning of the centrifugally operated switch to open the circuit connected therewith.

4. An interrupter switch for control circuits for starters of engines and the like comprising an engine operated centrifugally controlled mechanism for breaking a starter control circuit when said centrifugally controlled mechanism is moving at a predetermined rate, and a thermostatic device for varying the responsiveness of said centrifugally operated mechanism.

5. In combination with an engine-operated shaft operated in predetermined timed relation with the movement of said engine, a centrifugally controlled element mounted on said shaft to rotate therewith having leads forming part of said circuit, said leads being spaced from each other and closed normally below certain speeds by a contact element of appreciable weight, said contact element being operable above said engine speeds to move away from said leads whereby the starting circuit is broken, and thermostatic means for controlling the speed at which said circuit is broken.

6. In a device for controlling the starting circuit and control circuit of an engine comprising a rotatable member adapted to be connected operably to an engine operated part rotatable about a substantially vertical axis and movable in timed relation with the engine, pivoted cradles on said member, centrifugally operated make and break contacts on said cradles operable at and above predetermined engine speeds to break the circuit, means for automatically controlling the angle of said cradles about said pivots and for maintaining them in proper angular position for different engine temperatures, and means for connecting said centrifugally operated make and break contacts with a control circuit for said engine whereby said control circuit is interrupted upon said engine reaching a predetermined speed of rotation.

7. In a device for starter control circuits for engines and the like comprising a member adapted to be connected with a rotating part driven by said engine in timed relation therewith, a movable cradle on said member tiltable to various angles with respect to the horizontal, and a thermostatic element connected to said cradle for varying the angular relation thereof, said cradle having thereon a make and break contact member adapted to make and break a particular portion of the starter control circuit for said engine, said member being operable to break the circuit at different engine speeds varying according to the angular position of said cradle.

8. In a switch for association with a distributor which distributor comprises a two part casing and a substantially centrally located rotatable shaft geared to an engine to rotate in timed relation therewith, said shaft normally having a distributor arm for distributing the current to various engine cylinders in the proper order, a member adapted to replace the distributor arm, said member having a supplemental distributor arm-receiving portion whereby said distributor arm becomes displaced axially of said shaft a predetermined distance upon the insertion of said member on said shaft and the placing of the distributor arm on said member, and an extension for said casing comprising a section interposed between the two parts of said casing whereby said distributor arm retains its juxtaposition with respect to the contacts that lead to the various cylinders of the engine, said member having make and break contact elements thereon for breaking a circuit at and above a predetermined speed of rotation of said distributor shaft and said contact elements being thermostatically controlled to operate at different engine speeds.

9. A centrifugally operated switch comprising a pair of tiltable make and break contacts mounted for bodily rotation about an axis, leads connected to said make and break contacts, and thermostatic means for controlling the angular position of said make and break contacts, said make and break contacts being operable at predetermined speeds of rotation for breaking a circuit, the speed at which the breaking occurs being controlled by said thermostatic means.

10. A switch for interrupting control circuits for engine starters comprising a member to replace the distributor arm on the rotating shaft of a distributor, an insulated platform mounted on said member, and a contact ring insulated from said platform and member but carried by said member, an extension for the distributor casing, a contact brush on said casing in contact with said ring and having a lead, a pair of centrifugally operated circuit breaking members on said platform tiltable to various angular positions on said platform with respect to the horizontal, and each having an electrical conductor leading thereto from said ring and also an electrical conductor leading to a ground, both of said electrical conductors being spaced from each other and having centrifugally operated means for closing the gap therebetween to complete an electrical circuit, thermostatic means for controlling the angular position of said breaking members, said means for closing said gap being operable to move away from said conductors and break the connection therebetween when said platform rotates at predetermined speeds varying with the angular positions of said circuit breaking members.

11. An interrupter switch for control circuits for starters for engines and the like comprising an engine-operated centrifugal control mechanism for breaking the starter control circuit when said control mechanism is moving at a predetermined speed, and a thermostatic control element for varying the responsiveness of said engine-operated centrifugal mechanism.

12. In a control mechanism for starter circuits for engines and the like, a distributor, a centrifugally operated interrupter switch associated with said distributor and actuated in timed relation therewith, and a thermostatically controlled element for affecting the responsiveness of the switch at different engine speeds depending on the temperature of said engine, whereby the control circuit is interrupted at different engine speeds varying according to the temperature of the engine.

13. A switch for controlling the starting circuit for an engine comprising a rotatable member adapted to be geared to an engine-operated part rotatable about an axis and movable in timed relation with said engine, tiltable cradles on said member, and make and break contacts on said cradles operable at and above predetermined engine speeds to break a circuit depending on the angular position of said cradles, and means for automatically controlling the angle of said cradles to vary the speed at which said member must be rotated to break said circuit proportionate to different temperatures adjacent said automatic control means.

JAMES A. CHARTER.